W. F. & W. E. SMITH.
RESILIENT WHEEL.
APPLICATION FILED APR. 15, 1908.

907,904.

Patented Dec. 29, 1908.

WITNESSES:
A. W. Heape
R. L. Wallace.

INVENTORS
Walter F. Smith
William E. Smith
By Harry L. Wallace
ATTORNEY.

UNITED STATES PATENT OFFICE.

WALTER F. SMITH, OF WATERTOWN, AND WILLIAM E. SMITH, OF GOUVERNEUR, NEW YORK.

RESILIENT WHEEL.

No. 907,904.  Specification of Letters Patent.  Patented Dec. 29, 1908.

Application filed April 15, 1908. Serial No. 427,102.

*To all whom it may concern:*

Be it known that we, WALTER F. SMITH and WILLIAM E. SMITH, citizens of the United States, and residents, respectively, of Watertown, in the county of Jefferson and State of New York, and of Gouverneur, in the county of St. Lawrence and State of New York, have invented certain new and useful Improvements in Resilient Wheels, of which the following is a specification.

This invention relates to improvements in resilient wheels, designed for use in connection with vehicles generally, and the invention relates particularly to a wheel of novel construction for employment on automobiles and like conveyances.

The object of the invention is to provide a wheel of that class which employs non-inflated tires, thereby doing away with the short-lived pneumatic and solid rubber tires commonly used on the wheels of motor and other vehicles.

A further object of the invention is to provide a tire which is simple, reliable and strong, and which also embodies the desirable features of resilience, economy in production, and a long wearing-life.

The invention consists principally of a wheel having a concave rim, in which is fitted a coil of heavy steel wire, closely wound or coiled, and applied to the rim in the manner to form an endless peripheral coil, having a substantially clear interior throughout its length. Different gages of wire, and large or small coils being employed, accordingly as the nature or condition of the vehicle requires.

The invention further consists of novel and simple means for effectually securing or joining the ends of the coil, so as to produce an endless tire, without destroying the resilience or rendering the coil liable to break apart.

The invention further consists of simple and powerful means for clamping the tire to the rim of the wheel to prevent displacement or creeping.

To this end the invention consists in the combination, construction and arrangement of the parts of the wheel, as hereinafter fully described, illustrated by the accompanying drawing, and then pointed out in the claims.

Figure 1:
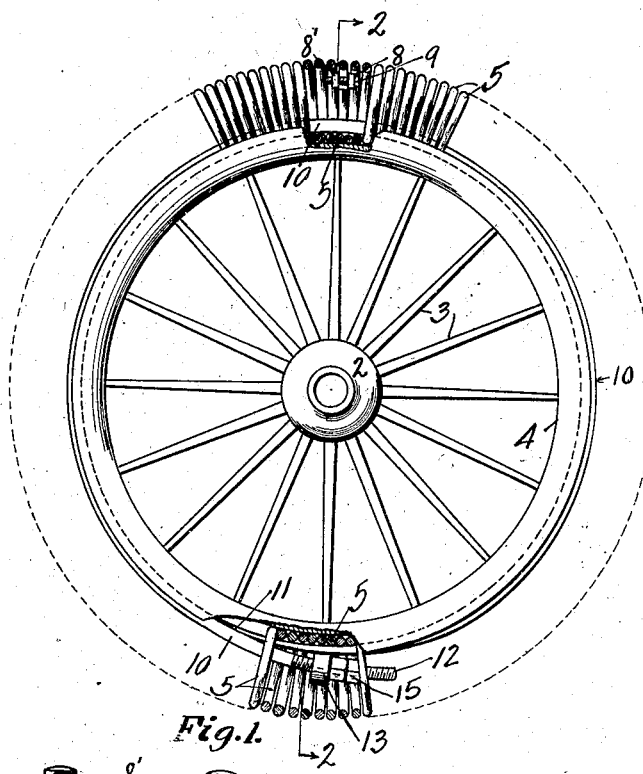
Figure 2:
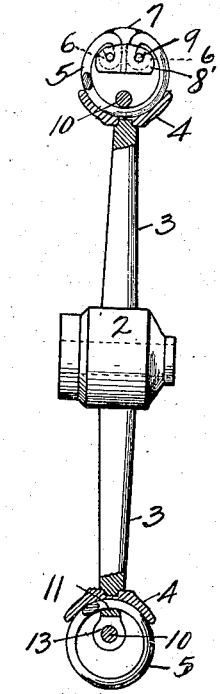
Figure 3:
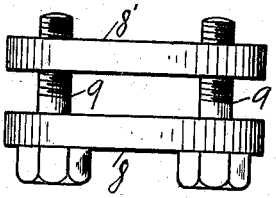
Figure 5:
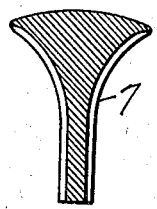
Figure 6:
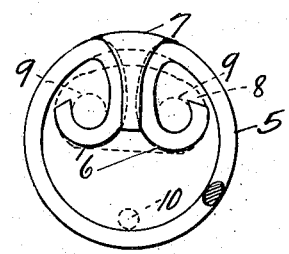
Figure 4:
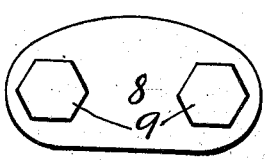
Figure 7:
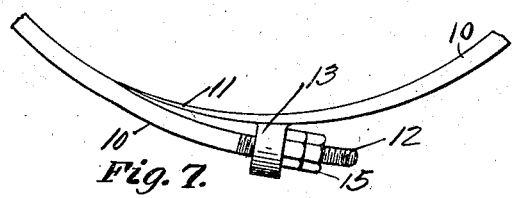

Referring to the drawing, Figure 1 is a side view of the wheel, the same being partly in elevation and partly in section, showing the various features of our invention. Fig. 2 is a central section, substantially on the line 2—2 of Fig. 1, showing particularly the method of rigidly connecting the abutting ends of the coil tire; also showing the location and arrangement of the tire clamping means. Figs. 3 and 4 are enlarged views, respectively, a plan and side elevation, of the parts employed for binding and securing the ends of the wire comprising the tire. Fig. 5 is an enlarged sectional view of the wedge or key employed for closing the opening between, and supporting the inturned ends of the coil. Fig. 6 is an enlarged sectional detail, showing the oppositely hooked or bent ends of the wire of the coil; also showing the wedge or filler in operative position. Fig. 7 is an enlarged detail view of a portion of the clamping band or hoop, showing the method for adjustably connecting and for locking the free ends of the same.

Similar reference characters represent corresponding parts in the several views.

Heretofore coil tires have been devised for use on wheels of various vehicles, but so far as we are aware, none have ever been successfully employed in regular service, principally because of the great difficulty in arriving at a practical and effective method of securing the ends of the wire to make an endless coil, and also effecting a positive clamping of the wire tire to the wheel rim to prevent creeping and displacement.

The present invention has for its object the complete remedying of all the defects and weaknesses of the devices and methods of the past, relating to resilient wheels of the class.

The following is a detail description of our improved wheel:

In the drawing, we have shown a wheel having a hub 2, and a series of spokes 3, which support and hold in operative position a concave rim 4, in which is seated a tire 5, consisting of an endless coil of wire. The tire 5 preferably comprises a heavy steel wire in one piece, wound in close coils, to a diameter to fit the peripheral cavity or groove of the rim. The tires may be coiled to different diameters and may consist of any suitable gage according to requirements, but preferably constructed out of the best quality of spring steel wire. In making the tires, the wire is first coiled in a straight section or part and then cut to a length suitable for forming the same into a circle or hoop which will snugly fit and fill the rim. The wheel may be constructed according to any suitable plan, provided the rim has an outwardly facing groove not less than 90° arc, in order to afford a proper seat for the tire. It is important in installing the tires for service, to crowd as many as possible of the coils, which comprise the tire, into the hollow rim, so as to completely fill the same, allowing no space between the coils. The free ends of the coil are then bent inwardly in opposite directions to form spiral hooks 6. When the ends of the tire are brought together as shown in Fig. 1, these hooks are brought closely together as illustrated in Figs. 2 and 6. When the ends of the coil are thus brought together the two hooks are disposed in the same plane and occupy the space of a single coil, leaving a V-shaped transverse opening in the center of the tread, into which is fitted a wedge or filler 7 of peculiar shape, having the thickness of a single wire of the coil, and having its top end convexed and formed to the same curvature as the coils of the tire, so that when the wedge is placed in position that portion of the tire appears the same as the rest. The curved side edges of the wedge or key 7 are concaved to conform to and fit the inner-facing edges of the hooks 6.

8, 8' represent a pair of clamping parts, preferably made of steel or other suitable metal and formed substantially alike, as shown. These clamping parts are disposed inside of the coil, one on each side of the hooks 6, as shown. These clamping parts are held in place by bolts 9 which preferably pass loosely through clamp 8, then through the hooks 6, after which the bolts enter threaded holes formed in the clamp 8', and by means of which all of these parts are drawn and held tightly together. In practice the clamps 8 and 8' are first attached to one of the hooks 6 by means of one of the bolts. The opposite end of the coil is then brought into position, the hook being placed between the clamps and the other bolt applied, and the whole tightened up by using a wrench which may be inserted between the coils opposite the heads of the bolts. After the ends of the coil are thus securely fastened together, the wedge 7 should be inserted by forcing it into the opening between the hooks 6 and also between the clamps 8 and 8'. When this has been done the clamps 8 and 8', the wedge 7, and the hooks 6 should all be brazed or welded together as one part. This completes the formation of the endless tire. The brazing of these parts is an essential feature of the joining of the ends of the coil and will prevent the tire from parting at this point, in case the bolts become loosened or detached by the jar and vibration of the wheel.

In order to securely fasten our tire to the rim of a wheel, so as to prevent displacement or creeping while the wheel is in service, we provide a novel and simple clamping band or member 10, preferably made of round steel or iron rod in the form shown in the drawing. This tire clamp should be made to a length greater than the inner circumference of the tire and one end should be formed flat and tapered off to a thin point, as 11. The other end 12 should be left round and threaded for a suitable distance to facilitate connecting the two ends and drawing the band tightly against the inner side of the coil, thereby clamping and holding the tire rigidly against the bottom of the rim cavity.

13 represents a perforated lug preferably formed integrally on the outer side of the tapered portion of the band 10, a short distance from the point of the same, through which the threaded end of the clamp passes.

15 15 represents nuts fitted to clamping member 10, to draw threaded end 12 through the lug 13. The tapering of one end of the clamp 10 permits the band to be set so as to bear tightly upon each and all of the coils of the tire, thus preventing any of the coils near the point where the ends of the clamp overlap, from springing away from the rim while the tire is in operation. The clamping hoop 10 should be inserted in the coil and the threaded end inserted through the lug 13 and the nuts screwed onto the end 12 a short distance before the ends of the coil are coupled. The clamp 10 should be left in that condition until the tire is placed in the rim and then the nuts should be screwed up tight. The overlapping ends of the clamp 10 are preferably disposed diametrically opposite the couplers 8 and 8' so as to counterbalance each other.

Practical tests and use of our tires have shown, that it is absolutely necessary for the successful operation of wheels equipped with this improvement, that the coil tire be securely and immovably clamped to the rim of the wheel. This end we accomplish by first arranging the tire so that the exact number of coils required to fill the rim are crowded into the groove and then by applying our improved clamping-band and drawing the same up tight, as described.

When our tires are made and applied as herein shown and described they impart to a vehicle practically the same degree of resilience as the well known solid or inflated rubber tires, because, when the close and even coils as first made, are afterwards formed into circular or endless parts and fitted to the wheel rims, the coils remain tightly together on the inner circumference of the tire, while at the peripheral side, the coils will be spread a greater or less distance apart owing to the diameter or curvature of the wheel. The effect of this arrangement and feature of the coils of the tire is such that, as the wheel rolls forward or backward, a number of coils adjacent to the portion of the wheel which bears on the ground will become closed up by reason of the weight of the vehicle, and the force of the driving, and as the vehicle travels over undulating or rough courses, the tension of the spring tire, which at all times tends to keep the individual coils spread apart, will yield enough to impart the equivalent of the resilience experienced by one when riding in a car equipped with a common rubber tire.

In addition to the features last described our tires possess other superior advantages not found in any other tires, particularly, in that they are comparatively indestructible and insure a wearing life many times greater than the rubber tires in common use.

It is obvious that some changes or modifications of the parts may be made, without departing from the spirit of our invention, and we therefore do not restrict ourselves to the precise construction and arrangement as herein shown and described.

Having thus described our invention, what we claim as new and desire to secure by Letters Patent, is—

1. A resilient wheel, having a concave rim provided with a tire consisting of a continuous coil of wire, the ends of said wire bent inwardly in opposite directions to form spiral hooks, adapted when the ends of the coils are brought into abutting contact to stand in the same plane and spaced slightly apart, a pair of perforated clamping-members disposed in said coil spaced apart sufficiently to receive said hooks, a pair of threaded bolts passing through said clamping-members, to bind said hooks and clamping-members together, and a wedge disposed in the space between said hooks and also between said clamping-members and said bolts.

2. The combination, with a wheel having a peripherally concaved rim provided with a tire of coiled wire in one part, of a hook formed on each end of said coiled wire, the said hooks adapted when the coiled wire is formed into an endless tire, to face oppositely and stand in the same transverse plane within said coil, a pair of clamping-plates, one disposed on each side of the said hooks, the said plates having perforations corresponding to the bight of each of said hooks, and a pair of thread-bolts to hold said clamping-plates and hooks together, thereby forming an endless tire out of said coiled wire.

3. A wheel rim having an outwardly facing groove provided with a continuous coil of wire having its ends bent to form inwardly projecting hooks, the said hooks, when the coil is coiled into a tire, disposed in the same plane in a manner to leave a V-shaped opening or gap in the periphery of the tire between said hooks, a wedge adapted to tightly fit and fill said opening or gap and form with said hooks a continuous strand or coil of the tire, and means, comprising a pair of perforated clamp-plates and a pair of bolts for connecting and holding said hooks and said wedge in operative position.

4. A wheel rim having an outwardly facing groove provided with a continuous coil of wire having its ends bent to form inwardly projecting hooks, the said hooks, when the coil is coiled into a tire, disposed in the same plane in a manner to leave a V-shaped opening or gap in the periphery of the tire between said hooks, a wedge adapted to tightly fit and fill said opening or gap and form with said hooks a continuous strand or coil of the tire, means, comprising a pair of perforated clamp-plates and a pair of bolts for connecting and holding said hooks and said wedge in operative position, a spiral clamping-band disposed in the tire having one end flat and tapering to a thin edge, the other end being round, the flattened portion provided with a perforated lug, the round end threaded and capable of being inserted through the lug, and a pair of nuts fitted to the threaded end of the band for drawing and holding the tire tightly against the rim of the wheel.

In testimony whereof we affix our signatures in presence of two witnesses.

WALTER F. SMITH.
WILLIAM E. SMITH.

Witnesses:
WM. F. CANOUGH,
HARRY DE WALLACE.